United States Patent [19]

Jones

[11] 4,081,192
[45] Mar. 28, 1978

[54] TRASH PICKER

[76] Inventor: Floyd S. Jones, 3033 Cheek Rd., Durham, N.C. 27704

[21] Appl. No.: 738,273

[22] Filed: Nov. 2, 1976

[51] Int. Cl.² ............................................. A01D 9/06
[52] U.S. Cl. .................................................... 294/61
[58] Field of Search ................... 15/104 R, 169, 184; 17/30; 30/129; 56/400.8; 119/88; 294/50, 50.5, 50.8, 61

[56] References Cited

U.S. PATENT DOCUMENTS

| 355,767 | 1/1887 | Knowlton | 17/30 X |
|---|---|---|---|
| 1,246,487 | 11/1917 | Summers et al. | 294/61 |
| 1,343,811 | 6/1920 | Denman | 30/129 |
| 1,485,300 | 2/1924 | Scott | 294/61 |
| 2,552,467 | 5/1951 | Thomas | 30/129 UX |
| 2,804,336 | 8/1957 | Thompson | 294/61 |
| 3,368,554 | 2/1968 | Chou | 15/184 X |
| 3,663,050 | 5/1972 | Fuchs | 294/50 |
| 4,001,910 | 1/1977 | Peilet | 15/184 |

FOREIGN PATENT DOCUMENTS

| 1,225,829 | 2/1960 | France | 15/169 |
|---|---|---|---|
| 96,839 | 5/1897 | Germany | 119/88 |
| 851,758 | 10/1960 | United Kingdom | 56/400.08 |

OTHER PUBLICATIONS

Article entitled Litter Picker Cleans Itself–Popular Science–Jan. 1950, p. 107.

Primary Examiner—Daniel Blum
Attorney, Agent, or Firm—Victor J. Evans & Co.

[57] ABSTRACT

A trash picker comprising a handle, a block at one end of said handle normally disposed thereto, a plurality of spikes mounted in said block to extend normally therefrom in a direction remote from said handle. A stripper plate having a plurality of holes therein to accommodate said spikes that pass therethrough. First end flanges disposed on said stripping plate which flanks said block and extends upwardly towards said handle. Second end flanges slideably disposed over said first end flanges and provided with screw and slot means to fasten said first and second flanges together and therefor the user may vary their combined extent, a pressure plate connected to said second end flanges at an area remote from and parallel to said stripper plate overlying a portion of said handle and above said block, and spring means connected from said handle to said pressure plate so that said stripper plate is normally in a position to leave said spikes exposed.

1 Claim, 5 Drawing Figures

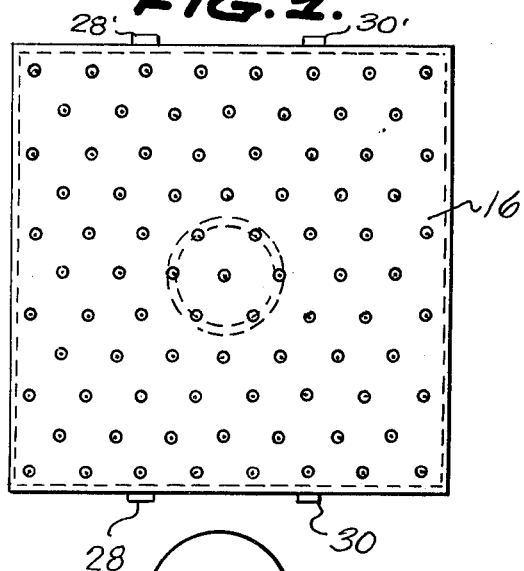
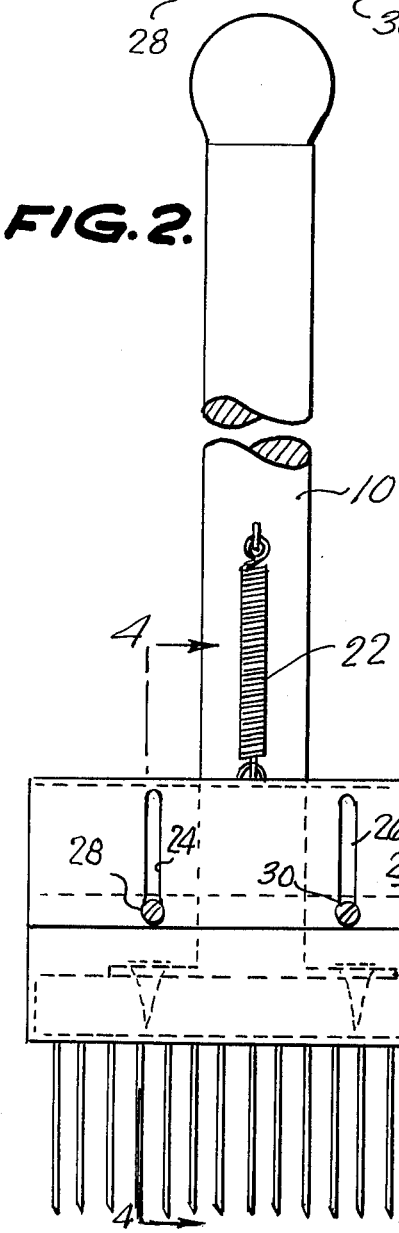
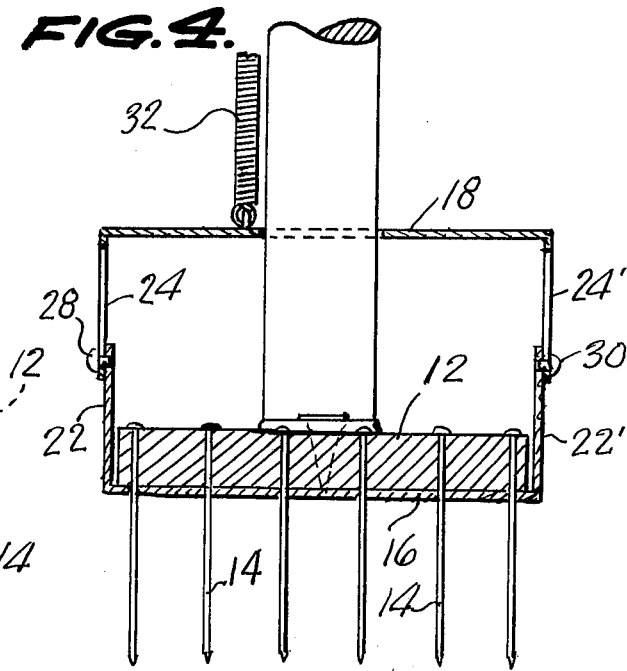
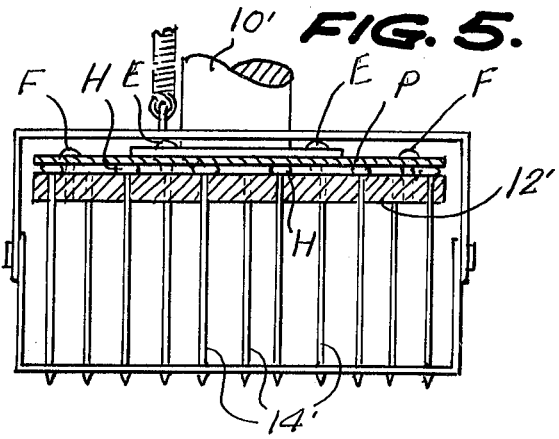
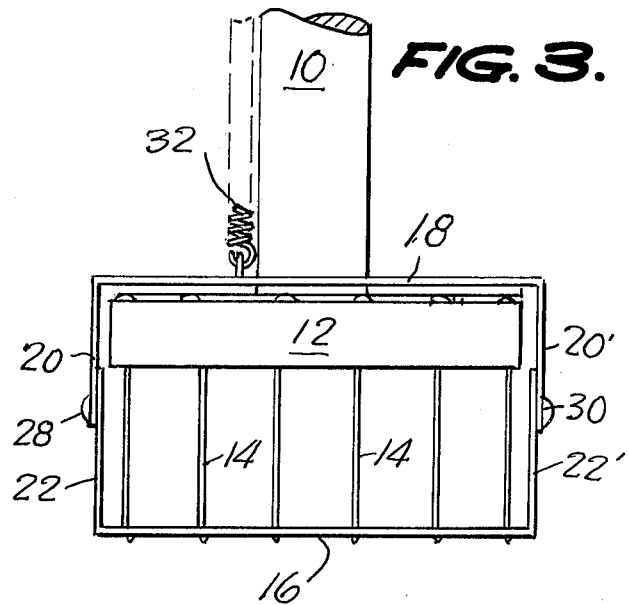

TRASH PICKER

SUMMARY OF THE INVENTION

It has been long known that a stick with a spike on the end may be used to pick up scraps of paper and other trash. It has been found, however, that this well known device will not always pick up small pieces of paper, for one reason because it is so difficult to accurately impale a small scrap of material. Also, in the known litter pickers it is necessary to frequently remove the trash that as been picked up as the single point cannot be used to pick up many separate items such as cigarette stubs.

It is an object, therefore, of the present invention to provide a litter picker that will pick up such small items as cigarette butts, cigarette packages, match books, paper cups, gum wrappers and other miscellaneous trash.

It is further an object of this invention to provide a trash picker with a stripper plate so that the trash need not be touched by the hand of the operator.

Other and further objects and advantages will appear from the following specification taken with the accompanying drawings in which like reference characters refer to similar parts in the several views.

BRIEF DESCRIPTION OF THE DRAWINGS

FIG. 1 is a view of the bottom or working end of the picker;

FIG. 2 is a front elevation;

FIG. 3 is a side elevation;

FIG. 4 is a section taken on line 4—4 of FIG. 2; and

FIG. 5 is a sectional view of a modified form of the invention.

DESCRIPTION OF THE PREFERRED EMBODIMENT

As seen in FIG. 2 the picker of this invention comprises an elongated handle 10 which may be of wood or of tubing to which a block of wood or plastic 12 is secured at the bottom end. A plurality of spikes 14 of fairly small diameter extend downwardly from block 12.

The spacing of the spikes is preferably as shown closely ranked in one direction and less closely ranked in the other. The provision of many spikes and having them fairly close together permits picking up of small fragments of litter that could not be picked up by the known pickers.

It also appears that, due to having so many spikes so closely arranged, small fragments of trash could not be removed by hand. A stripper plate 16 is therefore provided that normally lies closely against block 12. Stripper 16 is of any suitable material such as metal or stiff plastic and is provided with a plurality of holes, to accomodate each spike 14.

In order to move stripper plate 16 down along spikes 14 to push litter off of the ends of the spikes when necessary, a pressure plate 18 is provided that extends across the top of the block 12. Plate 18 has a hole through which handle 10 extends. The end flanges 20, 20' extend down from plate 18 to overlap upturned end flanges 22, 22' of stripper plate 16. Plate 18, like stripper 16 may be of metal or plastic. Ends 20, 20' are provided with elongated slots 24, 24' and 26, 26'. Screws 28, 28' and 30, 30' operate therefore to adjustably secure the plate 18 to stripper plate 16.

A spring 32 is secured to plate 18 adjacent handle 10, and to handle 10 to be under sufficient tension to bias plate 18, and therefore stripper plate 16, upwardly to hold stripper plate 16 in normal position against block 12.

It is undesirable that the stripper plate 16 be extended so far down spikes 14 as to lie beyond the points of spikes 14. The spikes 14 will in use especially on paved areas, wear down. As spikes 14 wear, the distance between plates 16 and 18 may be adjusted by screws 28, 28', 30, 30' in slots 24, 24', 26, 26' so that when plate 18 is pressed down against the top surface of block 12, the stripper plate will descend almost, but not quite to the extreme points of spikes 14.

In FIG. 5 a modified form of the litter picker is illustrated having a handle 10', a block 12' with a plurality of spikes 14' extending therethrough with their heads H engaged against the top surface of the block 12' a plate P engages the heads H of the spikes 14' and is secured to block 12' by removable fastening elements F. The handle 10' is secured to the plate P and block 12' by removable fastening elements E.

The use and operation of the modified form of the invention is identical to the preferred form of the invention with the exception that the spikes 14' may be easily replaced when bent or broken.

Having thus described the preferred embodiment of the invention it should be understood that numerous structural modifications and adaptations may be resorted to without departing from the spirit of the invention.

What is claimed is:

1. A trash picker comprising a handle, a block secured to one end of said handle normally disposed thereto, a plurality of spikes mounted in said block to extend normally therefrom in a direction remote from said handle, a stripper plate movable from a retracted to an extended position and having a plurality of holes therein to accommodate said spikes that pass therethrough, first end flanges disposed on said stripping plate which flank said block and extend upwardly towards said handle, second end flanges slidably disposed over said first end flanges, screw and longitudinally extending slot means to adjustably fasten said first and second end flanges together enabling the user to vary their combined extent, a pressure plate connected to said second end flanges at an area remote from and parallel to said stripper plate overlying a portion of said handle and above said block, and spring means connected from said handle to said pressure plate so that said stripper plate is normally in the retracted position contiguous with the block to leave said spikes exposed the stripper plate being adjustable so that it would extend almost, but not quite to the extreme points of the spikes clearing the same.

* * * * *